Patented Dec. 8, 1936

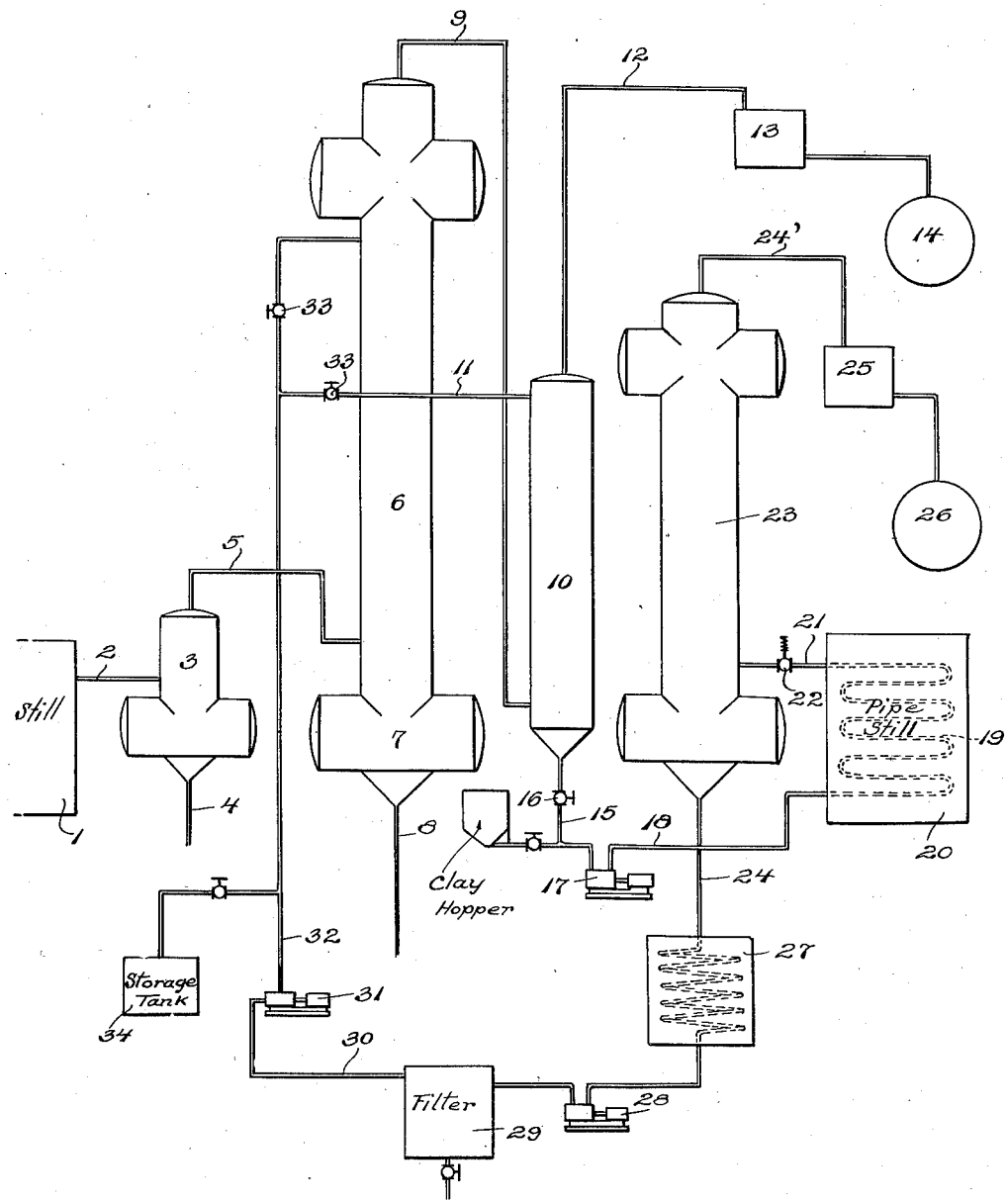

2,063,522

UNITED STATES PATENT OFFICE 2,063,522

POLYMERIZATION OF HYDROCARBONS

Rudolph C. Osterstrom, Kenilworth, Ill., assignor to The Pure Oil Company, Chicago, Ill., a corporation of Ohio Application February 1, 1929, Serial No. 336,868
Renewed September 20, 1934

4 Claims. (Cl. 196—79)

This invention refers to an improved method for treating hydrocarbons, such as distillates or vapors obtained from cracking apparatus, stills or the like, for the purpose of removing from the hydrocarbons under treatment gum-forming and color-imparting bodies, with the end in view of securing a treated substantially gum-free motor fuel oil of desired color.

In certain oil cracking operations, particularly high temperature vapor phase operations and to a certain extent in low temperature or liquid phase operations, oils are produced containing a large percentage of unsaturates that include compounds which, if unremoved, tend to discolor the final condensate and produce gum deposits therein. These bodies, therefore, render an untreated distillate unsuitable for use as a commercial motor fuel.

In my prior application Serial No. 329,417 filed December 31, 1928, I have described a method of removing these undesirable bodies which consists generally in introducing a finely divided, solid catalyst, such as fuller's earth, to a body of oil discharged from a still, cracking apparatus or other heater, and then bringing the adsorbent into intimate contact with the oil by forcing the latter under pressure, together with the catalyst, and while in the state of vapor through a heater, and then permitting the materials to expand under reduced pressures in a separating chamber, in order to separate the treated vapors from the polymerized, liquid and clay-bearing compounds.

In connection with the operation of my prior system I have observed that in order to secure a final product having a desired gum content and color it is necessary when the system is first operated to employ a relatively large amount of the catalytic, contact or adsorbent material. After the system is in operation for a certain period of time it is found that the same specifications of the end product can be secured by employing a very materially reduced amount of the contact or catalytic material as compared with that originally used when the operation of the system is first initiated. As the run proceeds, I have found that I can still further reduce the amount of clay or other catalytic material used until after substantially seven days operation I am maintaining the same quality and specifications of the end product with about one half the quantity of clay which was employed when the system was originally started. After the system has been in operation, careful investigation fails to reveal the presence of clay accumulations in the system that might have a tendency to give better action as the run proceeds. In order to account for this condition, I am of the opinion, although I do not definitely limit myself to the theory, that polymerization is accelerated when the material to be polymerized contains a percentage of "polymers" that is, previously polymerized oils. The present invention, therefore, resides in introducing into the oil under treatment polymers in regulated proportions to accelerate the polymerization of certain compounds present in the fresh oil undergoing treatment.

It is another object of the invention to separately remove the polymerized oil from the treated products, and then, after removing the clay or other treating material from the polymerized oil, to return the latter to the oil undergoing polymerization in the main treating passages or zones of the system, in order that the polymerized oil may be employed after the manner of a catalyst, to promote polymerization reactions of the oil under treatment and passing through the main treating zones of the system.

By way of illustration and to more fully develop the features of the present invention, there has been illustrated in the accompanying drawing in diagrammatic form apparatus and a flow diagram by which one specific form of the invention may be considered in detail.

Referring more particularly to the drawing, the numeral 1 designates a cracking still, converter, reaction chamber or distillation unit. In this connection it will be understood that the invention may be used in the purifying of vapors released from (1) a vapor phase converter, or other high temperature cracking unit; (2) a cracking still of a liquid phase converter; (3) the reaction chamber or expander of a liquid phase converting system; or (4) a pipe still, shell still or other source of hydrocarbon vapor supply. In all of these operations hydrocarbon vapors may be produced containing undesirable compounds from a color or gum regulation standpoint. In vapor phase systems of conversion this is especially true, since in such systems the evolved vapors must be treated to remove therefrom gum, color, odor producing and other compounds which require elimination before the end product can be commercially handled. While a cracked vapor phase distillate requires treatment in these respects, distillates obtained from liquid phase cracking systems also require similar treatment as well as vapors obtained from other heat treating units.

From the unit 1 vapors which are generated therein pass by way of a pipe 2 into an evaporator 3. The materials which remain unvaporized in the unit 1 or which condense in the evaporator collect as liquids in the bottom of said evaporator and are withdrawn by way of the line 4. The vapors of the evaporator pass overhead by way of the line 5 and a fractionating tower 6. In this tower the liquid condensate, which accumulates in the bottom drum 7 is withdrawn by way of a pipe line 8 or may be employed as recycle stock. The vapors which are released from the top of the tower 6 are conducted by way of the pipe line 9 into the lower portion of a scrubbing tower 10. The top of this tower is provided with a line 11 by means of which polymer-containing oils are introduced into the top of the tower 10 for direct contact with the ascending vapors passing through said tower. The source of this descending contact oil will be later described. The descending oil passes through the tower 10 in countercurrent relation to the ascending vapors, intimately contacting with said vapors and removing therefrom all high boiling point compounds which may be entrained in said vapors. In addition the vapors are subjected to direct contact with the polymerized compounds contained in the reflux oil in order to remove from the vapors the undesirable gum-forming constituents which they may possess. The vapors pass overhead from the tower 10 by way of the pipe line 12, and may be circulated through a condenser 13 and then to a storage tank 14 as a finally treated product.

There collects in the bottom of the tower 10 a quantity of liquefied hydrocarbons, consisting of the polymer-containing oil introduced by way of the line 11 and the condensed oils obtained from the vapors flowing through the tower 10. These oils pass from the tower 10 by way of a line 15 in which is provided a control valve 16, and are led into a pump 17, in order that said oils, together with thoroughly intermingled polymers and clay, added at the pump 17, may be forced through a pipe line 18 leading to a coil bank 19 arranged within the setting of a pipe still 20.

Through the medium of the pump 17 relatively high temperatures are maintained on the oil under heat treatment in the pipe still. These pressures may be approximately 200 pounds per square inch and at the same time the oil within the pipe still is heated to a temperature of approximately 650° F. These temperatures and pressures have been found to be effective in securing proper reactions in the matter of effective polymerization of the undesirable gum-producing compounds. I have observed that the higher the temperature in the pipe still the greater is the efficiency of the treating process, all conditions being equal, and for this reason I employ temperatures considerably higher than those used in analogous prior processes. At the temperatures and pressures specified the oil thus undergoing treatment remains or is maintained in the vapor phase, the pressures and temperatures utilized being high enough to thoroughly impregnate the oil undergoing treatment with the catalytic compounds present therein.

After circulating through the coil bank of the pipe still, the oil is passed through a pipe line 21 provided with a pressure release valve 22, and thence into a fractionating tower 23, where the oil vapor may be maintained at a pressure slightly above atmospheric. The clay, if present, and the polymerized hydrocarbons in liquid form are collected in the bottom of the tower 23 and may be continuously removed therefrom by a pipe line 24, the lighter or purified fractions passing overhead, by way of a pipe line 24' to a condenser 25 and thence to a storage tank 26. The liquefied hydrocarbons which are collected in the tank 26 are substantially free from compounds which tend to discolor the same or to produce gums or resinous substances therein. These oils may be used as motor fuels and possess a water-white color, a satisfactory odor, good stability upon exposure to light or air as regards resistance to discoloration and possess a negligible gum content.

This system has been generally described in my aforesaid co-pending application but the present invention resides particularly in passing the treating clay and polymerized oil through a cooler 27, connected with the pipe line 24, in which the oil and clay mixture is brought down to a desired temperature. The mixture is then forced by means of a pump 28 through a filter 29, such as a Sweetland filter press, in which the clay or other contact material is removed from the polymerized oil. This oil is then forced from the outlet side of the filter 29 through a pipe line 30 by means of a pump or the like 31 to the pipe line 11 leading into the top of the tower 10 and into the top of the tower 6 so that the polymer containing oil may come into direct contact with the vapors passing through the towers 6 and 10. The pipe line 32 leading from the pump 31 may be provided with suitable valves 33 for regulating the flow and quantity of polymer-containing oil into such towers, there being a tank 34 arranged in communication with the pipe line 32 for receiving an excessive quantity of the polymer-containing oil. If finely divided clay is used in connection with the system such clay may be introduced into the inlet side of the pump 17 in order that it may be forced with the oil under treatment through the pipe still.

With the operation of this system I am enabled to operate quite economically from a standpoint of clay consumption. The system provides for the maintenance of a desired amount of polymers in contact with the oil vapors undergoing purification and through the medium of the valves 33 this regulation may be conveniently carried out. In certain runs, depending upon the character of the material under treatment, I have found that the clay may be eliminated, although at present in the majority of operations I employ fuller's earth or other finely divided clays, but in a greatly reduced amount as compared with former practices. Insofar as I am aware, the present invention constitutes the first system to utilize polymer-bearing oils as catalysts or contact materials for facilitating polymerization reactions in other oils, and I therefore claim this discovery in its application to purification systems of the general character above set forth.

What is claimed is:

1. The method of decolorizing and degumming cracked petroleum oils containing high percentages of unsaturated compounds which comprises: passing a stream of such oils in a substantially vaporous state from a cracking zone through a fractionating zone, bringing into intimate contact with said vapors during the passage of the latter through the fractionating zone regulated quantities of high boiling oils containing polymerized petroleum bodies, the latter being introduced into said vapors in such quantities as to effect polymerization of undesired compounds present therein, removing from one end of said fractionating zone uncondensed oils as a treated end product, separately removing from another portion of said fractionating zone a condensate composed of relatively higher boiling oils and containing said polymerized bodies, passing the mixture of said condensate and polymerized bodies under superatmospheric pressures through an elongated externally heated polymerizing zone of restricted cross sectional area to effect further polymerization of undesired compounds of the condensate, withdrawing the products of the polymerizing zone and separating the same under reduced pressure to effect the removal as vapors of the desired treated oils from the undesired high boiling polymer containing oils, and returning a portion at least of such polymer containing oils to the fractionating zone for admixture with the cracked oil vapors passing therethrough.

2. The method of decolorizing and degumming cracked petroleum oils containing high percentages of unsaturated compounds, which comprises: passing a confined stream of such oils in a substantially vaporized state obtained from a cracking zone through a fractionating zone, during the passage of the vapors through the fractionating zone, bringing into intimate contact therewith regulated quantities of high boiling oils containing polymerized petroleum bodies to effect primary polymerization of undesired compounds present in said vapors, removing from one portion of said fractionating zone uncondensed oils as a treated end product, separately removing from another portion of said fractionating zone a condensate composed of relatively higher boiling oils and containing said polymerized bodies, introducing into the mixture of said condensate and polymerized bodies an adsorbent catalyst, subjecting this mixture to the action of heat and pressure to effect further polymerization of undesired compounds present in the condensate, removing the products of such further polymerization from the influence of heat and pressure to effect the removal as vapors of the desired treated oils from the undesired high boiling polymer containing oils, and returning a portion at least of said polymer containing oils to the fractionating zone for admixture with vapors passing therethrough.

3. The process of recovering gasoline suitable for use as motor fuel from cracked hydrocarbon vapors containing light and heavy gasoline constituents, which comprises fractionating a stream of cracked hydrocarbon vapors substantially free from constituents heavier than gasoline, in the presence of hydrocarbon polymers, to separate vapors of a light gasoline fraction suitable for use as motor fuel and a condensed heavier gasoline fraction requiring further treatment, withdrawing said condensed heavier gasoline fraction containing said polymers and subjecting the mixture to elevated temperature and an elevated pressure not less than 200 pounds per square inch to effect a polymerization of undesirable gum-forming constituents to polymers having boiling points above a gasoline boiling-point range, reducing the pressure on said treated fraction and fractionating it under the thereby reduced pressure to separate polymers, including those formed in said treatment, from the treated vapors, withdrawing vapors from the last-mentioned fractionation step and condensing them to recover the desired treated heavy gasoline fraction, and returning at least a portion of said polymers to the first-mentioned fractionating step.

4. The process of recovering gasoline suitable for use as motor fuel from cracked hydrocarbon vapors containing light and heavy gasoline constituents, which comprises fractionating a stream of cracked hydrocarbon vapors substantially free from constituents heavier than gasoline, in the presence of hydrocarbon polymers, to separate vapors of a light gasoline fraction suitable for use as motor fuel and a condensed heavier gasoline fraction requiring further treatment, withdrawing said condensed heavier gasoline fraction containing said polymers and subjecting the mixture to contact with a solid adsorptive catalytic material at an elevated temperature and under elevated pressure to effect a polymerization of undesirable gum-forming constituents to polymers having boiling points above a gasoline boiling-point range, reducing the pressure on said treated fraction and fractionating it under the thereby reduced pressure to separate said catalytic material and polymers formed in said treatment from the treated vapors, withdrawing vapors from the fractionation step and condensing them to recover the desired treated heavy gasoline fraction, removing clay from the polymers separated in said last-mentioned fractionating step and returning at least a portion of said polymers to the first-mentioned fractionating step.

RUDOLPH C. OSTERSTROM.